Dec. 13, 1966  YOSHIHARU KONDO ET AL  3,292,081
APPARATUS FOR MEASURING THE NEGATIVE RATIO OF VOLTAGE
Filed May 17, 1963

INVENTORS
YOSHIHARU KONDO
SHUJI NAKAZAWA
BY Hopgood & Calimafde
ATTORNEYS.

United States Patent Office 3,292,081
Patented Dec. 13, 1966

3,292,081
APPARATUS FOR MEASURING THE NEGATIVE RATIO OF VOLTAGE
Yoshiharu Kondo and Shuji Nakazawa, Tokyo, Japan, assignors to Nippon Electric Company, Limited, Tokyo, Japan, a corporation of Japan
Filed May 17, 1963, Ser. No. 281,255
Claims priority, application Japan, June 4, 1962, 37/23,066
5 Claims. (Cl. 324—57)

This invention relates to apparatus for measuring the negative dividing ratio or negative increase ratio of voltage, and is particularly useful in connection with analog computers.

It is an object of this invention to provide apparatus for measuring both the negative voltage dividing ratio and the negative voltage increase ratio of a circuit by means of a single measuring circuit.

All of the objects, features and advantages of the invention and the manner of attaining them will become more apparent and the invention itself will be best understood by reference to the following description of an embodiment of the invention taken in conjunction with the accompanying drawing, in which FIG. 1 shows a conventional circuit for measuring the dividing ratio;

In analog computers, a number of negative feedback type integrators, adders and sign changers and many coefficient setting potentiometers are provided and the equations to be solved are represented by suitable combinations of these elements for quickly obtaining the solutions to these equations. In order to enhance the precision, means such as the dividing ratio comparator type calibrating apparatus of FIG. 1 is also usually provided to calibrate the potentiometers.

These potentiometers are provided with dials for indicating the dividing ratios, however a certain amount of dial error is unavoidable. Moreover, as will be seen in FIG. 1, a potentiometer P usually has a load resistance R, which produces errors in the dividing ratio due to load effect. To eliminate these errors it is customary to calibrate the dividing ratio of the potentiometer by forming a bridge circuit with a standard variable voltage divider $P_s$, detecting the balance point by a galvanometer M, and reading the value of $P_s$ when the bridge is balanced from which value is obtained the accurate dividing ratio of the potentiometer P including the load effect.

Figure 2:
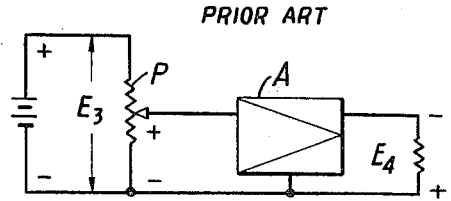
FIG. 2 shows a conventional circuit in which the output voltage from a negative feedback amplifier is reversed in polarity and produces a negative dividing ratio or negative voltage increase ratio.

If the coefficient of any term in the equation to be solved is negative, a voltage polarity reversal circuit A as shown in FIG. 2 is employed to reverse the voltage phase and the negative coefficient is obtained as $-E_4/E_3$. Since the sign changer generally comprises a negative feedback amplifier, not only a negative dividing ratio but also a negative increase ratio may be obtained, and cases may therefore be encountered where the absolute value of the negative coefficient is greater than unity.

Figure 1:
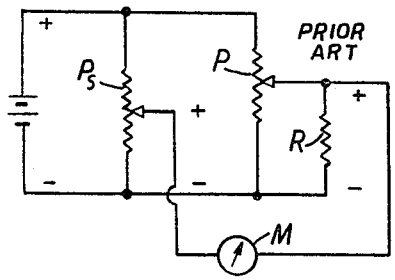

Since the negative dividing ratios and negative increase ratios cannot be measured by means of the dividing ratio comparator type calibrating apparatus such as shown in FIG. 1, other methods have been devised but prior to this invention no method has been devised which is based on a zero method and which is free from errors.

Figure 3:
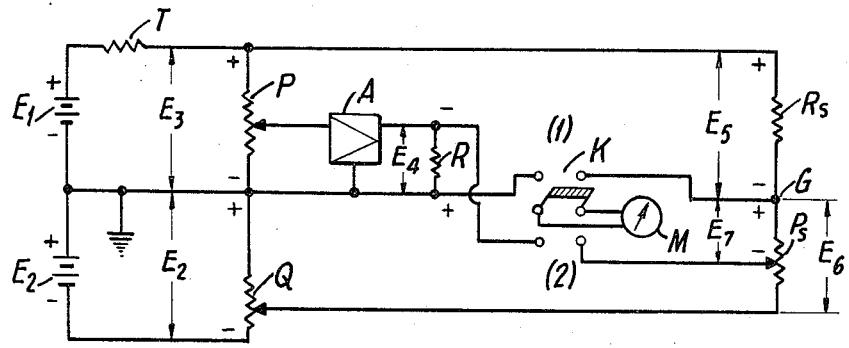
FIG. 3 shows an apparatus in accordance with the invention for measuring negative dividing ratio or negative increase ratio.

FIG. 3 shows a circuit in accordance with the teaching of the invention for measuring both the negative dividing ratio and the negative increase ratio. In FIG. 3, D.C. voltage sources $E_1$ and $E_2$, connected in series relationship, are grounded at this common connection, and may be regarded as a single D.C. source with a grounded intermediate tap. The circuit to be measured comprises the resistor R, the potentiometer P and the amplifier A, one side of this circuit being grounded. Q is a variable voltage divider resistor, $R_s$ a proportional arm resistor, and $P_s$ a standard variable divider resistor. The circuit to be measured, along with the resistances Q, $R_s$ and $P_s$, constitute four arms of a bridge circuit. $E_3$ to $E_7$ denote the voltage drops across the corresponding portions shown. In the present measuring circuit it is necessary that $E_3 \leq E_2$, and this condition can easily be satisfied by connecting a resistor T of suitable value between the battery $E_1$ and the bridge circuit to serve as a voltage dropping resistor.

Figure 4A:
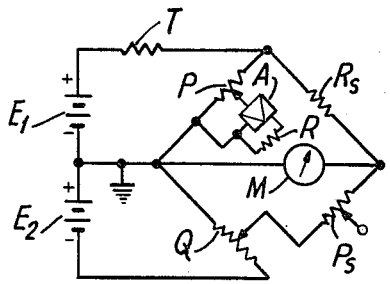
FIGS. 4a and 4b are circuit illustrations for use in explaining the operation of FIG. 3.

Now let us consider the case where the value $-E_4/E_3$ is less than unity. By setting $P_s = R_s$, throwing the switch K to the position (1), and adjusting the resistor Q so that the current in the meter M becomes zero, the point of common connection G between $R_s$ and $P_s$ will be at the same potential as ground and obviously $E_3 = E_5 = E_6$. In this case, i.e., with the switch K in position (1), the circuit will be as shown in FIG. 4(a).

Figure 4B:
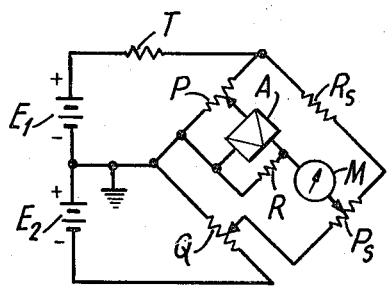

The switch K is then thrown to the position (2) and $P_s$ is adjusted so that the meter M again reads zero. Since the voltage difference $E_7$ between the dividing point and G is in the same direction as $E_4$, a balance is attained where $-E_4/E_3$ is equal to the dividing ratio of the standard divider $P_s$, thus enabling the measurement of the negative dividing ratio by the zero method. The circuit in this case, i.e. with the switch K in position (2) is shown in FIG. 4(b).

For a voltage increase ratio where $-E_4/E_3 > 1$, the same measuring method as just described in connection with FIG. 3 may be used. For example, selecting the value of $R_s$ so that $P_s/R_s = n$, where $(n > 1)$ and $E_2/E_3 > 1$, and taking the balance twice, as described above, we get $E_3 = E_5$, $E_6 = nE_5$, whence $E_6 = nE_3$. Since $E_7 = -E_4$, $E_4/E_3 = nE_7/E_6$. Thus the increase ratio is equal to $n$ times the dividing ratio of $P_s$. If $n$ is selected to be 10 or 100, the negative voltage increase ratio is conveniently obtained as 10 or 100 times the dividing ratio of $P_s$.

Although in FIG. 3 a fixed resistor T is provided to make $E \leq E_2$, T may be a variable resistor to accommodate changes in source voltages, and to provide flexibility so that different values of source voltage may be used.

Although the voltage source $E_1 - E_2$ has been shown as having its middle tap grounded in FIG. 3, it will be understood that the invention may be practiced with an ordinary ungrounded source. In such case, the resistor T would not always be necessary and the variable resistor Q need not be of the variable divider type but may be of the variable resistor type. Also, if the circuit to be measured is not grounded on one side, yet the same measurement will be achieved.

Figure 5:
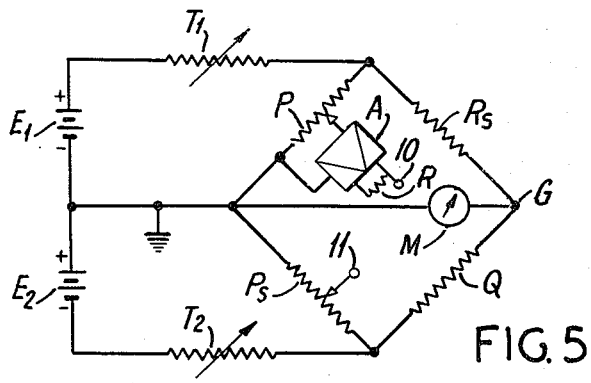
FIG. 5 shows an alternative embodiment of the invention.

FIG. 5 shows another embodiment of the invention, where the resistor Q is a fixed resistor, and where the ratio of the value of the proportional arm resistor Q to the value of the resistor $R_s$ is selected as $Q/R_s \geq n$ $(n > 1)$. In this figure the bridge circuit is formed as shown by the resistors Q, $R_s$, the circuit to be measured, and a standard variable divider $P_s$. Series variable resistors $T_1$ and $T_2$ are connected between the source $E_1 - E_2$ and the bridge circuit. In operation, one or both of $T_1$ and $T_2$ are first adjusted to balance the bridge. The meter M is then connected between the output terminal 10 of the circuit to be measured and the dividing point 11 of $P_s$, and by adjusting the dividing ratio by varying the slider on the standard divider $P_s$, balance is again produced. By this technique, the negative dividing ratio or increase ratio can be measured in the same way as in FIG. 3.

Although FIG. 5 may appear to be different from FIG. 3, it is essentially the same circuitry as FIG. 3 because point G is at the same potential as ground on the first balance step and therefore $R_s$ and $P_s$ may be substituted for one another. In other words, FIG. 5 can be derived from FIG. 3 and regarded as a modification of it.

It should be noted that by reorganizing the circuits shown in FIGS. 3 and 5 and using the standard divider $P_s$, an ordinary voltage dividing ratio measuring apparatus can be constructed which can measure not only negative dividing or increase ratios but also ordinary dividing ratios.

While the foregoing has been described with reference to D.C. voltage sources, the invention can also be practiced with A.C. voltage sources.

This invention is especially useful in the construction of analog computers. In analog computers, it is common to have positive and negative stable D.C. sources whose absolute voltage values are equal, and to have the integrators, adders or sign changers grounded at their ends. Accordingly, the circuit of the invention, as shown in FIGS. 3 and 5 for example, is very suitable as a calibrator for negative dividing ratio or negative increase ratio in analog computers. From the foregoing explanations it will be appreciated how to measure the negative dividing ratio or increase ratio when the integrators, adders or sign changes in the computers are not grounded, or when the voltage source is not grounded.

As will also be appreciated, the present invention provides a calibrating apparatus for an analog computer which is capable of calibrating not only the positive coefficient but also the negative coefficients in given equations, thereby improving the usefulness and precision of the computer.

While the foregoing description sets forth the principle of the invention in connection with specific apparatus, it is to be understood that the description is made only by way of example and not as a limitation of the scope of the invention as set forth in the objects thereof and in the accompanying claims.

What is claimed is:

1. Apparatus for measuring negative voltage dividing ratio and negative voltage increase ratio comprising
a bridge circuit having four arms, a pair of input terminals, and a pair of output terminals.
two sources of potential connected in series adding relationship across said input terminals,
means connecting the point of connection between said two potential sources to one of said output terminals,
said first arm including a circuit under test having an output terminal which produces a negative voltage dividing ratio or negative voltage increase ratio,
said second arm comprising a variable divider resistor and being connected in series with said first arm between said input terminals,
said third arm comprising a proportional arm resistor,
said fourth arm comprising a standard variable divider resistor and being connected in series with said third arm between one of said output terminals and the variable contact on said variable divider resistor,
a current indicating means,
means for connecting said current indicating means between said output terminals whereby said bridge is balanced by first adjusting said variable divider resistor,
and means for then connecting said current indicating means between said output terminal of said circuit under test, and whereby the variable contact on said standard variable divider resistor, negative dividing ratio or negative increase ratio can be accurately determined from the setting of said standard variable divider resistor when said latter resistor is adjusted until said current indicating means indicates zero current.

2. The invention as set forth in claim 1 which further includes means for producing a potential drop, said latter means being connected between one of said potential sources and one of said bridge input terminals.

3. Apparatus for measuring negative voltage dividing ratio or negative voltage increase ratio comprising,
a bridge circuit having four arms, first and second input terminals, and first and second output terminals,
two sources of potential connected in series adding relationship across said input terminals,
means connecting the point of connection between said two potential sources to said first output terminal,
said first arm including a circuit under test with an output terminal which produces a negative voltage dividing ratio or negative voltage increase ratio, said first arm being connected between said first input terminal and said first output terminal with said one end of said circuit under test connected to said first output terminal,
said second arm comprising a variable divider resistor connected between said first output terminal and said second input terminal,
said third arm comprising a proportional arm resistor connected between said first input terminal and said second output terminal,
said fourth arm comprising a standard variable divider resistor connected between said second output terminal and the variable contact on said variable divider resistor,
a galvanometer,
means for connecting said galvanometer between said output terminals whereby said bridge is balanced by first adjusting said variable divider resistor,
and means for then connecting said galvanometer between said output terminal of said circuit under test and the variable contact on said standard variable divider resistor, whereby the negative dividing ratio or negative increase ratio can be accurately determined from the setting of said standard variable divider resistor when said latter resistor is adjusted until said galvanometer indicates zero current, 4. The invention as set forth in claim 3, which further includes a potential dropping resistor connected between one of said potential sources and said first input terminal.

5. Apparatus for measuring negative voltage dividing ratio or negative voltage increase ratio comprising
a bridge circuit having four arms, first and second input terminals, and first and second output terminals,
first and second sources of potential connected in series adding relationship,
a first variable resistor connected between said first potential source and said first input terminal and a second variable resistor connected between said second potential source and said second input terminal,
means connecting the point of connection, between said two potential sources to said first output terminals,
said first arm including a circuit under test with an output terminal which produces a negative voltage dividing ratio or negative voltage increase ratio, said first arm being connected between said first input terminal and said first output terminal with one end of said circuit under test connected to said first output terminal,
said second arm comprising a standard variable divider resistor connected between said first output terminal and said second input terminal, said third arm comprising a proportional arm resistor connected between said first input terminal and said second output terminal,
said fourth arm comprising a resistor connected between said second output terminal and said second input terminal,
a galvanometer,
means for connecting said galvanometer between said output terminals whereby said bridge is balanced by adjusting one or both of said first and second variable resistors,
and means for connecting said galvanometer between said output terminal of said circuit under test and the variable contact on said standard variable divider resistor, whereby the negative dividing ratio or negative increase ratio can be accurately determined from the setting of said standard variable divider resistor when said latter resistor is adjusted until said galvanometer indicates zero current.

No references cited.

WALTER L. CARLSON, *Primary Examiner.*

W. H. BUCKLER, E. E. KUBASIEWICZ,
*Assistant Examiners.*